UNITED STATES PATENT OFFICE.

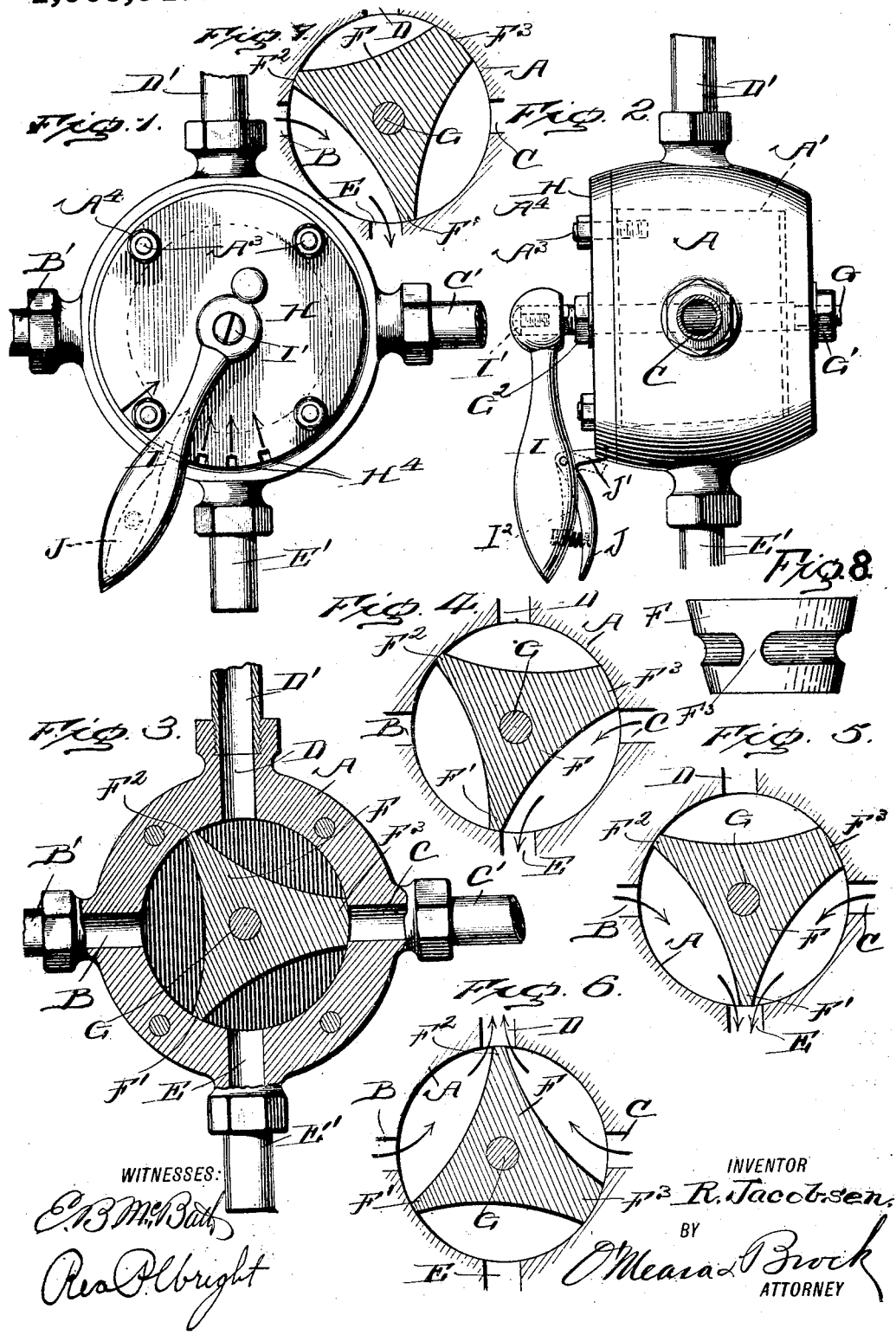

RICHARD JACOBSEN, OF CHICAGO, ILLINOIS.

FOUR-WAY COCK.

1,005,549.   Specification of Letters Patent.   Patented Oct. 10, 1911.

Application filed April 24, 1906. Serial No. 313,447.

*To all whom it may concern:*

Be it known that I, RICHARD JACOBSEN, a subject of the King of Norway, residing at Chicago, in the county of Cook and State of Illinois, have invented a new and useful Improvement in Four-Way Cocks, of which the following is a specification.

This invention relates to stop cocks and more particularly to four way cocks, the object being to provide a cock which is very simple and cheap in construction and one which is very effective in use.

Another object of my invention is to provide a cock which is especially adapted for bath tubs, sinks and washtubs, and one which is so constructed that the hot and cold water pipes can be attached thereto, thereby doing away with one cock.

Another object of my invention is to provide a cock with a turning plug so constructed that the cold and hot water can be allowed to run as desired or both at the same time.

The invention consists in the novel features of construction, hereinafter fully described and pointed out in the claim.

In the drawings forming a part of this specification:—Figure 1 is a face view of the cock. Fig. 2 is a side view of the cock. Fig. 3 is a vertical sectional view partly in elevation. Fig. 4 is a detail sectional view showing the cold water port opened. Fig. 5 is a detail sectional view showing the hot and cold water ports opened, and the lower outlet port opened. Fig. 6 is a detail sectional view showing the hot and cold water ports opened, and the upper outlet port opened. Fig. 7 is a detail sectional view showing the hot water port opened. Fig. 8 is a side elevation of the plug detached.

In the drawings A, indicates the valve casing which is provided with a horizontal tapering recess A', having oppositely disposed inlet ports B and C, and oppositely disposed outlet ports D and E, provided with internally threaded ends in which the hot and cold water pipes B' and C', and stud outlet pipes D' and E', are adapted to be secured, the upper pipe being adapted to receive the shower tube.

The valve consists of a tapering plug F which fits within the recess A' and which is fixed upon a bolt G. This plug is cut away for the purpose of forming water passages, so that a central cross section will show the plug triangular in shape and provided with wings F', F² and F³ the ends of which engage the inner walls of the valve casing A. The wings F' and F² are at their ends of less width than the diameter of any of the ports in the casing A, but the wing F³ is of such thickness that it will close any of the ports when brought into proper alinement with them. The bolt G is mounted in suitable openings one of which is formed in one end of the casing A and the other of which is formed in an end plate H, the bolt being held in position by suitable nuts G' and G².

Spaced openings are formed in the plate adjacent its edge through which the bolts A³, arranged on the casing adjacent the opening, are adapted to pass, and be secured by nuts A⁴. The end of the bolt G is formed square on which the square opening of the hand-lever I, is adapted to be secured by a screw I'.

The plate H, is provided with spaced recesses H⁴, marked by arrows in which the angled end J', of the spring actuated catch J, pivoted in a groove I², of the hand-lever I, is adapted to fit and lock the plug in any position desired.

From the foregoing description it will be seen that I have provided a very simple and cheap cock which will be a great saving in filling bath-tubs and sinks.

Having thus fully described my invention, what I claim as new and desire to secure by Letters Patent is:—

A device of the kind described, comprising a valve casing having a tapering recess provided with oppositely disposed inlet ports and oppositely disposed outlet ports, adapted to be connected respectively with hot and cold water pipes and with discharge pipes, a bolt passing centrally through said valve casing, a handle for rotating said bolt, a tapering plug fixed upon said bolt said plug having its sides cut out, said cut out portions forming water passages and being separated from each other by three wings, two of said wings being at their ends of less thickness than the diameters of the ports and the other wing being at the end of greater width than the diameter of the ports, an end plate for the valve casing, said end plate having recesses therein, and means carried by the handle for engaging said recesses and locking the said handle in an adjusted position.

RICHARD JACOBSEN.

Witnesses:
　CHARLES E. LITTLE,
　J. RODE-JACOBSEN.